(12) United States Patent
Fanous et al.

(10) Patent No.: US 10,553,858 B2
(45) Date of Patent: Feb. 4, 2020

(54) LITHIUM ELECTRODE FOR A RECHARGEABLE LITHIUM-ION BATTERY AND METHOD FOR THE MANUFACTURE THEREOF

(71) Applicant: Robert Bosch GmbH, Stuttgart (DE)

(72) Inventors: Jean Fanous, Pfullingen (DE); Martin Tenzer, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 15/028,919

(22) PCT Filed: Sep. 9, 2014

(86) PCT No.: PCT/EP2014/069167
§ 371 (c)(1),
(2) Date: Jul. 11, 2016

(87) PCT Pub. No.: WO2015/055351
PCT Pub. Date: Apr. 23, 2015

(65) Prior Publication Data
US 2016/0315314 A1 Oct. 27, 2016

(30) Foreign Application Priority Data
Oct. 15, 2013 (DE) .......... 10 2013 220 785

(51) Int. Cl.
*H01M 4/36* (2006.01)
*H01M 4/04* (2006.01)
(Continued)

(52) U.S. Cl.
CPC .......... *H01M 4/366* (2013.01); *H01M 4/043* (2013.01); *H01M 4/0404* (2013.01);
(Continued)

(58) Field of Classification Search
CPC .......... H01M 4/366; H01M 2004/027; H01M 4/382; H01M 4/0404; H01M 4/043;
(Continued)

(56) References Cited

U.S. PATENT DOCUMENTS

| | | | | |
|---|---|---|---|---|
| 5,387,479 A | * | 2/1995 | Koksbang | ............... H01M 4/13 427/122 |
| 5,503,946 A | * | 4/1996 | Fauteux | ............... H01M 4/0452 205/59 |

(Continued)

FOREIGN PATENT DOCUMENTS

| | | |
|---|---|---|
| CN | 101911367 A | 12/2010 |
| CN | 102195044 A | 9/2011 |

(Continued)

OTHER PUBLICATIONS

International Search Report dated Nov. 17, 2014 for International Application No. PCT/EP2014/069167.

*Primary Examiner* — Milton I Cano
*Assistant Examiner* — Jennifer A Moss
(74) *Attorney, Agent, or Firm* — Norton Rose Fulbright US LLP; Gerard Messina

(57) ABSTRACT

A lithium electrode includes a first lithium layer made of lithium or a lithium alloy, a current collector situated on a first side of the lithium layer, and a lithium-ion-conducting protective layer situated on a second side of the lithium layer opposite the first side. An intermediate layer completely covers the second side of the lithium layer and is situated between the lithium layer and the protective layer. The protective and intermediate layers have an electrical conductivity of less than $10^{-10}$ S/cm. The lithium electrode may be used as the anode of a rechargeable lithium-ion battery. A lithium layer is applied to a current collector, an intermediate layer is applied to the lithium layer so that the
(Continued)

intermediate layer completely covers the lithium layer, and a lithium-ion-conducting protective layer is applied to the intermediate layer.

16 Claims, 4 Drawing Sheets

(51) Int. Cl.
*H01M 4/134* (2010.01)
*H01M 4/1395* (2010.01)
*H01M 4/38* (2006.01)
*H01M 10/0525* (2010.01)
*H01M 10/052* (2010.01)
*H01M 4/02* (2006.01)

(52) U.S. Cl.
CPC ....... *H01M 4/0438* (2013.01); *H01M 4/0445* (2013.01); *H01M 4/0447* (2013.01); *H01M 4/134* (2013.01); *H01M 4/1395* (2013.01); *H01M 4/382* (2013.01); *H01M 10/0525* (2013.01); *H01M 4/0423* (2013.01); *H01M 10/052* (2013.01); *H01M 2004/021* (2013.01); *H01M 2004/027* (2013.01)

(58) Field of Classification Search
CPC ............. H01M 4/0445; H01M 4/0447; H01M 4/1395; H01M 4/0438
See application file for complete search history.

(56) References Cited

U.S. PATENT DOCUMENTS

| | | | |
|---|---|---|---|
| 6,797,428 B1 * | 9/2004 | Skotheim | H01M 4/134 429/126 |
| 9,548,492 B2 | 1/2017 | Affinito et al. | |
| 2007/0172739 A1 * | 7/2007 | Visco | H01M 12/08 429/322 |
| 2009/0155676 A1 * | 6/2009 | Zhamu | H01M 2/166 429/129 |
| 2011/0177398 A1 * | 7/2011 | Affinito | H01M 4/134 429/325 |
| 2013/0059193 A1 | 3/2013 | Scordilis-Kelley et al. | |
| 2013/0295452 A1 * | 11/2013 | Ryu | H01M 4/382 429/211 |

FOREIGN PATENT DOCUMENTS

| | | |
|---|---|---|
| JP | 2000138057 A | 5/2000 |
| JP | 2010245000 A | 10/2010 |
| JP | 2011238404 A | 11/2011 |
| JP | 2012160345 A | 8/2012 |
| JP | 2015518644 A | 7/2015 |
| WO | 2011007549 A1 | 1/2011 |
| WO | 2014182063 A1 | 11/2014 |
| WO | 2013146792 A1 | 12/2014 |

* cited by examiner

LITHIUM ELECTRODE FOR A RECHARGEABLE LITHIUM-ION BATTERY AND METHOD FOR THE MANUFACTURE THEREOF

FIELD OF THE INVENTION

The present invention relates to a lithium electrode. It furthermore relates to a rechargeable lithium-ion battery, which includes the lithium electrode according to the present invention as the anode. Finally, it relates to a method for manufacturing the lithium electrode.

BACKGROUND INFORMATION

Rechargeable batteries of the so-called "rocking chair" type are believed to be understood, in which a carbon material, for example graphite, is used as the anode material, which is able to intercalate lithium ions at the intercalation sites of its lattice planes formed by carbon atoms in the form of six-membered rings when charging is carried out. Typically, a lithium intercalation material, such as $LiCoO_2$, $LiNiO_2$ or $LiMn_2O_4$, is used as the active cathode material, which is able to deintercalate the lithium ions from their intercalation sites during charging so that lithium ions migrate back and forth between the intercalation electrodes during the charging/discharging cycles.

A metallic lithium anode is used as the anode in various types of lithium batteries, in particular the so-called post lithium-ion batteries, such as Li-sulfur or Li-oxygen. The problem of irregular lithium deposition occurs in this anode, so that the porosity and the volume of the entire lithium anode increase continuously after repeated dissolution and deposition processes of lithium metal. This enlarges the internal surface on which the parasitic side reactions with the electrolyte take place.

In order to prevent these effects, the lithium anode is usually covered with a lithium-ion-conducting protective layer (e.g., polymer ion conductor, solid ion conductor), which prevents contact between lithium and the electrolyte. Due to the volume movements in the lithium anode as a result of the dissolution and re-deposition of lithium, the protective layer must also continuously move together with the lithium surface. It is known from experimental tests that none of the presently known ion-conducting materials as the protective layer withstands these volume movements over numerous charging/discharging cycles. Rather, fractures and cracks develop, which significantly impair the function of the protective layer. As long as this problem persists, even a protective layer that conducts ions very well is not able to offer lasting protection to the lithium anode against the electrolyte.

SUMMARY OF THE INVENTION

The lithium electrode according to the present invention includes a first lithium layer, a current collector situated on a first side of the first lithium layer, and a lithium-ion-conducting protective layer situated on a second side of the first lithium layer situated opposite the first side. An intermediate layer, which completely covers the second side of the first lithium layer, is situated between the first lithium layer and the protective layer. Both the protective layer and the intermediate layer each have an electrical conductivity of less than $10^{-10}$ S/cm, i.e., they are dielectrics. The intermediate layer functions as a stabilizing support matrix on the surface of the lithium layer. This matrix has the task of mechanically supporting the protective layer applied to the lithium in such a way that no stresses are transferred to the brittle protective layer due to the volume movements of the first lithium layer. It may be for this purpose that the intermediate layer is not made up of a continuously solid material, but has pores and/or openings. Particularly at least 10 volume percent of the intermediate layer may be pores and/or openings. It furthermore particularly may be that the intermediate layer includes continuous openings between the first lithium layer and the protective layer. These openings may be filled with lithium to establish a sufficient contact between the first lithium layer and the protective layer. For this purpose, it exceptionally may be that the continuous openings have a diameter in the range of 10 μm to 1000 μm.

It may be that the intermediate layer is made up of a lithium-ion-conducting material. If the intermediate layer has no continuous openings, it is necessary that it is made up of a lithium-ion-conducting material to enable the transport of lithium ions between the first lithium layer and the protective layer. Even when continuous openings are present, it is advantageous that the intermediate layer is made up of a lithium-ion-conducting material to further facilitate the lithium transport.

The intermediate layer may be made up of a material that is selected from the group including polymers, ceramics and mixtures thereof. The polymers may be three-dimensionally cross-linked polymers, i.e., duromers, in particular cross-linked polyacrylates and cross-linked epoxy resins. Further polymers may be thermoplastic polymers. Among these, polyolefins may be used, polyethylene, polypropylene and polystyrene may particularly be used. Furthermore, polycarbonates, polyethylene oxide and polyesters such as in particular polyethylene terephthalate (PET) may be used. Such polymers enable very flexible shaping of the intermediate layer, for example having defined structured openings. It is also possible to implement a fabric-like structure of the intermediate layer in this way, for example by initially carrying out a two-dimensional polymerization, thereafter a mechanical stretching, and finally a three-dimensional polycondensation by cross-linking. Such polymers furthermore have a low weight, which has the advantage that the specific energy of an electrochemical cell in which the lithium electrode is situated is not impaired by the intermediate layer. Finally, such polymers have good electrically insulating properties.

Ceramics that may be used are metal oxides, in particular aluminum oxide. Furthermore, lithium-ion-conducting ceramics, such as in particular LiPON and LiLaZr oxide may be used. Such ceramics are mechanically very stable and are little deformable by pressure. They may be manufactured in porous form by sintering, so that openings for introducing lithium are created. Finally, such ceramics are electrically good insulators and usually chemically very stable, so that they exhibit inert behavior in an electrochemical cell.

Mixtures of polymers and ceramics may be used in any arbitrary ratio as the intermediate layer. In this way, the advantages of polymers and ceramics may be combined.

The intermediate layer may have a thickness in the range of 0.1 μm to 100 μm, particularly may be in the range of 1 μm to 20 μm.

The protective layer is in particular made up of a material that is chemically stable against lithium.

The rechargeable lithium-ion battery according to the present invention includes a lithium electrode according to the present invention as the anode. The rechargeable lithium-ion battery in particular includes a liquid electrolyte for which the protective layer of the lithium electrode according to the present invention is impermeable.

In the method according to the present invention for manufacturing a lithium electrode, in particular a lithium electrode according to the present invention, a first lithium layer is applied to a current collector. An intermediate layer having an electrical conductivity of less than $10^{-10}$ S/cm is applied to the first lithium layer in such a way that the intermediate layer completely covers the first lithium layer. For this purpose, the intermediate layer may also protrude beyond the edges of the first lithium layer. A lithium-ion-conducting protective layer having an electrical conductivity of less than $10^{-10}$ S/cm$^2$ is applied to the intermediate layer.

In order to establish a lithium-ion-conducting connection between the first lithium layer and the protective layer, it may be that the intermediate layer has continuous openings between the first lithium layer and the protective layer. The intermediate layer may then be pressed into the first lithium layer in such a way that the continuous openings are filled with lithium.

It is may be the case to apply a second lithium layer to the intermediate layer after the same was applied to the first lithium layer and before applying the protective layer. This may take place in particular by vapor depositing lithium. In this way, the surface of the intermediate layer is smoothed. The first lithium layer thus must meet only low requirements with regard to its surface roughness, so that, for example, a lithium foil may be used as the first lithium layer. After the protective layer has been applied, the second lithium layer may be removed electrochemically. For this purpose, the lithium electrode as the anode is electrochemically contacted with a separator, an electrolyte and a counter electrode. If the lithium electrode is to be used in a rechargeable lithium-ion battery, the counter electrode may be the cathode which is also used during later operation of the rechargeable lithium-ion battery. However, it is also possible to use another counter electrode only for the purpose of the electrochemical removal of the second lithium layer and then remove it again. Subsequently, lithium is discharged from the second lithium layer of the lithium electrode until a form-locked joint is created between the protective layer and the intermediate layer. The intermediate layer may then serve as a supporting structure beneath the protective layer to absorb all mechanical stresses during volume movements in an electrochemical cell in which the lithium electrode is situated, so that these may not result in damage to the protective layer. Since both the protective layer and the intermediate layer are electrically insulating according to the present invention, lithium ions are no longer able to accumulate between these two layers, so that the direct connection of the two layers is maintained at all times.

Exemplary embodiments of the present invention are shown in the following drawings and are described in greater detail in the following description.

DETAILED DESCRIPTION

Figure 1:
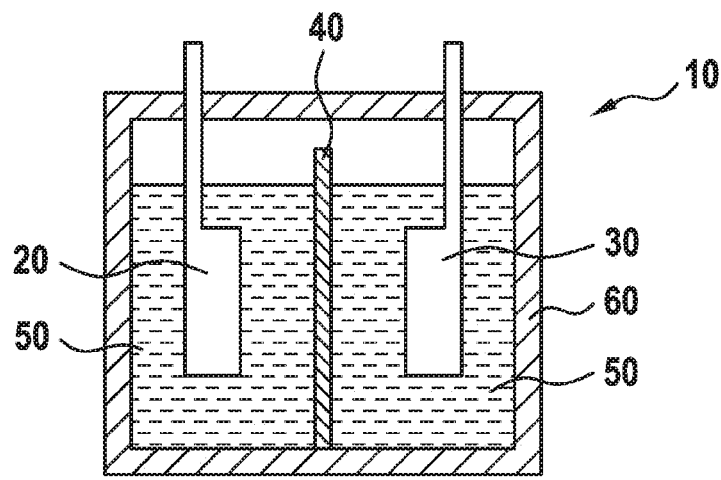
FIG. 1 shows a cross-sectional illustration of a rechargeable lithium-ion battery according to the related art.
Figure 2:
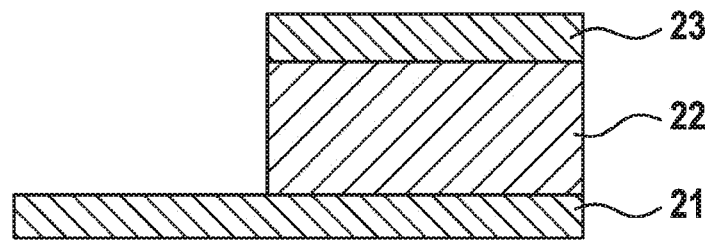
FIG. 2 shows a cross-sectional illustration of the anode of a rechargeable lithium-ion battery according to the related art.
Figure 3A:
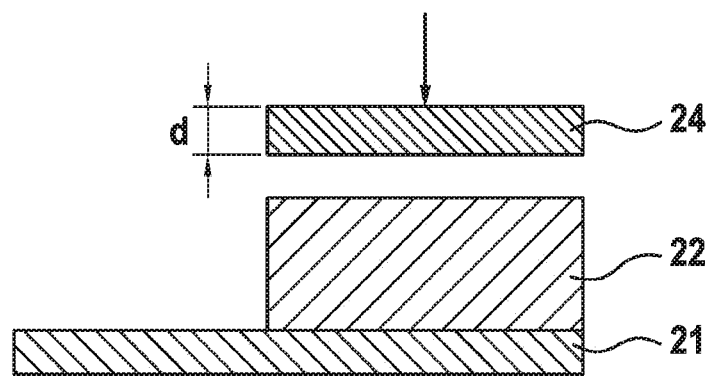
FIG. 3a shows a first step of the manufacture of a lithium electrode according to one specific embodiment of the present invention.
Figure 3B:
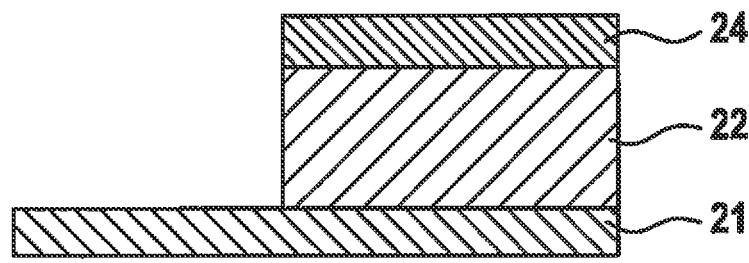
FIG. 3b shows a second step of a manufacture of a lithium electrode according to one specific embodiment of the present invention.
Figure 3C:
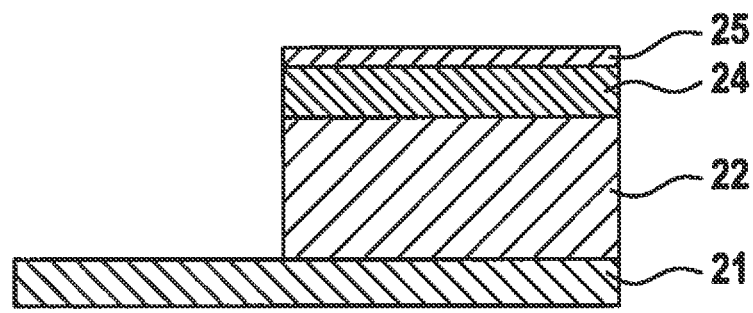
FIG. 3c shows a third step of a manufacture of a lithium electrode according to one specific embodiment of the present invention.
Figure 3D:
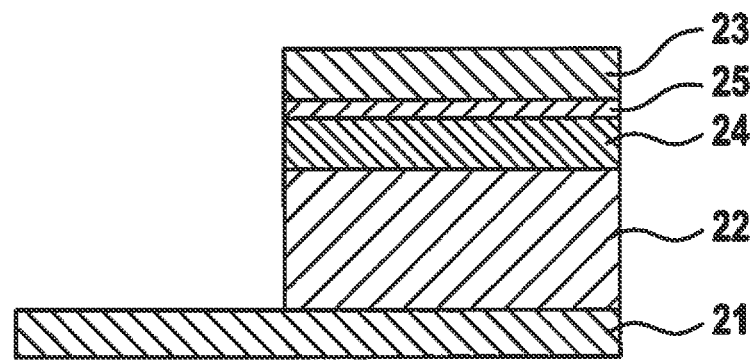
FIG. 3d shows a fourth step of a manufacture of a lithium electrode according to one specific embodiment of the present invention.
Figure 3E:
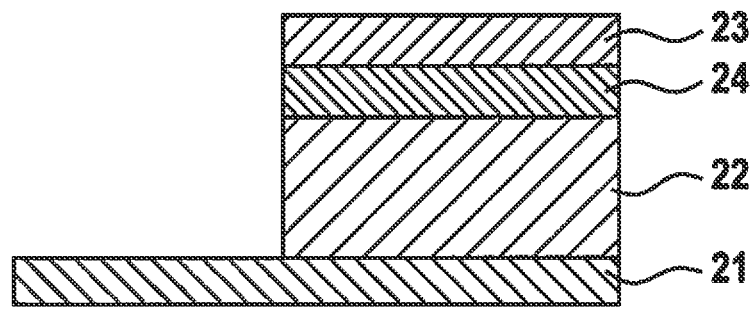
FIG. 3e shows a cross-sectional illustration of a finished lithium electrode according to one specific embodiment of the present invention.
Figure 4A:
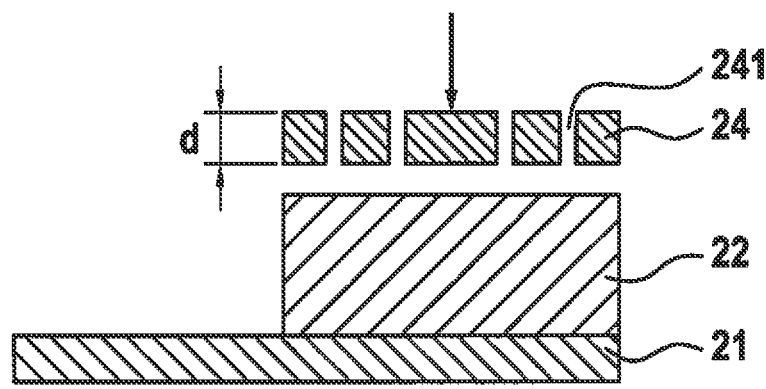
FIG. 4a shows a first step of a manufacture of a lithium electrode according to another specific embodiment of the present invention.
Figure 4B:
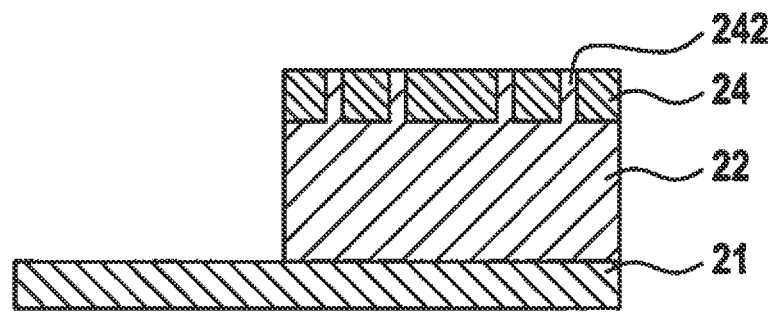
FIG. 4b shows a second step of a manufacture of a lithium electrode according to another specific embodiment of the present invention.
Figure 4C:
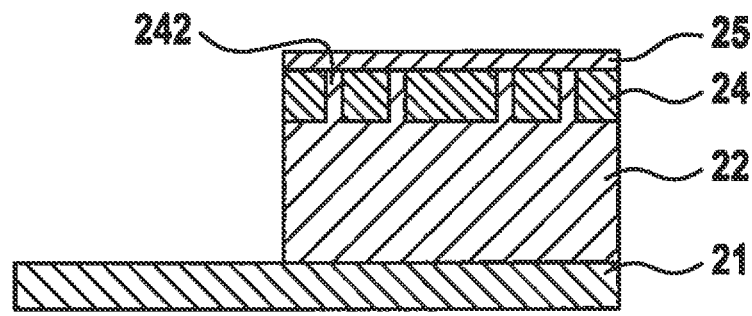
FIG. 4c shows a third step of a manufacture of a lithium electrode according to another specific embodiment of the present invention.
Figure 4D:
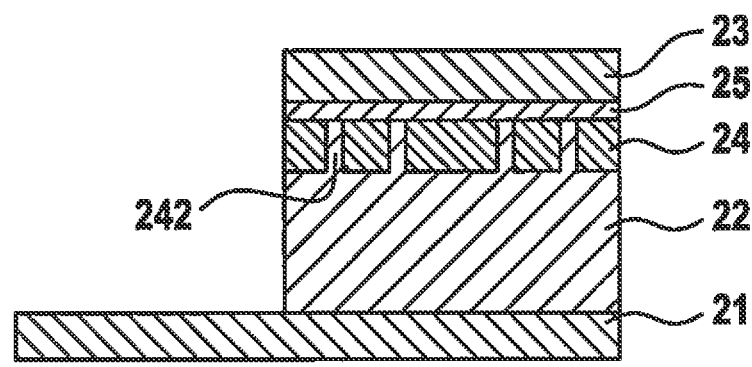
FIG. 4d shows a fourth step of a manufacture of a lithium electrode according to another specific embodiment of the present invention.
Figure 4E:
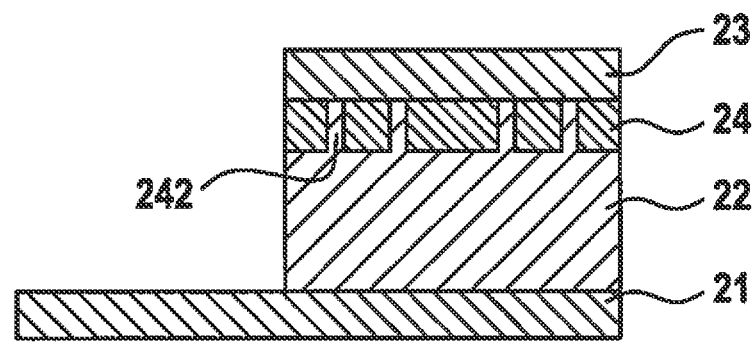
FIG. 4e shows a cross-sectional illustration of a finished lithium electrode according to another specific embodiment of the present invention.

A schematic cross-sectional illustration of a conventional rechargeable lithium-ion battery 10 is shown in FIG. 1. An anode 20 includes active anode material and an anode current collector. A cathode 30 includes active cathode material and a cathode current collector. A separator 40 prevents internal short circuits from occurring between electrodes 20, 30 by spacing the two electrodes 20, 30 apart from each other and electrically insulating them from each other. A liquid electrolyte 50 is situated between the two electrodes 20, 30. This electrolyte typically includes a solvent and a lithium-containing salt. The two electrodes 20, 30, separator 40 and electrolyte 50 together are situated in a housing 60. The current collector of anode 20 and the current collector of cathode 30 each penetrate housing 60 and thus enable the electrical contacting of anode 20 and cathode 30. FIG. 2 shows a detailed view of the anode of the rechargeable lithium-ion battery according to FIG. 1. This anode is composed of an anode current collector 21, a lithium layer 22 and a protective layer 23. Protective layer 23 is made up of an electrically insulating and lithium-ion-conducting material. Protective layer 23 prevents the contact between lithium layer 22 and electrolyte 50. During operation of the rechargeable lithium-ion battery 10, protective layer 23 must continuously move together with the surface of lithium layer 22 due to the dissolution and re-deposition of lithium on lithium layer 22. This results in fractures and cracks in protective layer 23.

FIGS. 3a through 3e show how a lithium electrode according to a first specific embodiment of the present invention may be manufactured. Initially, an electrode current collector 21 made up of copper is provided, on whose surface a lithium foil is provided as first lithium layer 22. A sintered small plate made of LiPON having a thickness d of 10 μm is also provided. This small plate is open-pored, but sintered without continuous openings. It is pressed mechanically into first lithium layer 22 and thus applied to its surface as intermediate layer 24. Since it has no continuous openings, no continuous lithium connections through intermediate layer 24 are created. The option of a lithium ion transport through intermediate layer 24 is rather ensured by the lithium ion conductivity of the LiPON material. To smooth the surface of intermediate layer 24, a second lithium layer 25, whose thickness is less than thickness d of intermediate layer 24, is vapor-deposited thereon. A protective layer 23 made up of, e.g., ion-conducting lithium-lanthanum-zirconium oxide, is deposited onto second lithium layer 25. Thereafter, the lithium electrode is situated as anode 20 in rechargeable lithium-ion battery 10 according to FIG. 1. There, lithium is removed from second lithium layer 25 of the lithium electrode until a form-locked joint has been created between protective layer 23 and intermediate layer 24.

The manufacture of a lithium electrode according to a second specific embodiment is shown in FIGS. 4a through 4e. Initially, as in the first specific embodiment of the lithium electrode according to the present invention, a copper electrode current collector 21 is provided, which on its surface has a 10 µm thick lithium foil 22. Furthermore, a fabric-like sheet material made up of a cross-linked polyacrylate is provided. This sheet material has continuous openings 241 in its fabric-like structure. Thereafter, the fabric-like sheet material is mechanically pressed into first lithium layer 22 in such a way that the upper edge of the fabric-like sheet material and the upper edge of lithium foil 22 are situated at the same height. Lithium 242 from first lithium layer 22 thereby penetrates into continuous openings 241 and thus establishes continuous lithium channels between first lithium layer 22 and the side of intermediate layer 24 facing away from first lithium layer 22. As in the first specific embodiment of the lithium electrode according to the present invention, a second lithium layer 25 is now vapor-deposited onto the surface of intermediate layer 24, and a second protective layer 23 is deposited on second lithium layer 25. Subsequently, this lithium electrode may also be situated in the rechargeable lithium-ion battery according to FIG. 1 as anode 20, and lithium may be deposited from second lithium layer 25 until a form-locked joint has been created between protective layer 23 and intermediate layer 24. The transport of lithium ions through intermediate layer 24 in this specific embodiment of the present invention does not take place based on a lithium ion conductivity of the material of intermediate layer 24, but rather through lithium channels 242 in openings 241 of intermediate layer 24.

During its use as a primary or secondary lithium battery, a rechargeable lithium ion battery 10, which includes a lithium electrode according to one of the above-described specific embodiments of the present invention as anode 20, has a longer service life than a rechargeable lithium-ion battery 10 which includes a conventional lithium anode according to FIG. 2 as anode 20. This applies regardless of whether a traditional or a novel cathode is used as cathode 30. Such a rechargeable lithium-ion battery 10 may be used, for example, in power tools, garden equipment, computers, notebooks, PDAs and mobile telephones, in hybrids and plug-in hybrids and in electric vehicles. Due to the particularly high requirements with regard to the service life of rechargeable batteries in automobile applications, it is particularly suitable for hybrids, plug-in hybrids and electric vehicles.

What is claimed is:
1. A lithium electrode, comprising:
  a first lithium layer, which is made up of lithium or a lithium alloy;
  a current collector situated on a first side of the first lithium layer;
  a lithium-ion-conducting protective layer situated on a second side of the first lithium layer situated opposite the first side; and
  an intermediate layer, which completely covers the second side of the first lithium layer, situated between the first lithium layer and the protective layer, both the protective layer and the intermediate layer each having an electrical conductivity of less than $10^{-10}$ S/cm, the intermediate layer having continuous openings extending from the first lithium layer to the protective layer, the continuous openings being filled with the lithium or lithium alloy to provide continuous channels of the lithium or lithium alloy extending from the first lithium layer to the protective layer.

2. The lithium electrode of claim 1, wherein the intermediate layer has pores.

3. The lithium electrode of claim 1, wherein at least 10% by volume of the intermediate layer are the continuous openings.

4. The lithium electrode of claim 1, wherein the continuous openings have a diameter in the range of 10 µm to 1000 µm.

5. The lithium electrode of claim 1, wherein the intermediate layer is made up of a lithium-ion-conducting material.

6. The lithium electrode of claim 1, wherein the intermediate layer is made up of a material which is selected from the group including polymers, ceramics and mixtures thereof.

7. The lithium electrode of claim 1, wherein the intermediate layer has a thickness d in the range of 0.1 µm to 100 µm.

8. A rechargeable lithium-ion battery, comprising:
  a lithium electrode that is an anode and that includes:
    a first lithium layer, which is made up of lithium or a lithium alloy;
    a current collector situated on a first side of the first lithium layer;
    a lithium-ion-conducting protective layer situated on a second side of the first lithium layer situated opposite the first side; and
    an intermediate layer, which completely covers the second side of the first lithium layer, situated between the first lithium layer and the protective layer, both the protective layer and the intermediate layer each having an electrical conductivity of less than $10^{-10}$ S/cm, the intermediate layer having continuous openings extending from the first lithium layer to and the protective layer, the continuous openings being filled with the lithium or lithium alloy to provide continuous channels of the lithium or lithium alloy extending from the first lithium layer to the protective layer.

9. A method for manufacturing a lithium electrode, the method comprising:
  applying a first lithium layer, which is made up of lithium or a lithium alloy, to a current collector;
  applying an intermediate layer having an electrical conductivity of less than $10^{-10}$ S/cm to the first lithium layer so that the intermediate layer completely covers the first lithium layer; and
  applying a lithium-ion-conducting protective layer having an electrical conductivity of less than $10^{-10}$ S/cm to the intermediate layer,
  wherein the intermediate layer has continuous openings extending from the first lithium layer to the protective layer, the continuous openings being filled with the lithium or lithium alloy to provide continuous channels of the lithium or lithium alloy extending from the first lithium layer to the protective layer.

10. The method of claim 9, further comprising pressing the intermediate layer into the first lithium layer so that the continuous openings are filled with the lithium or lithium alloy.

11. The method of claim 9, wherein a second lithium layer, which is made up of lithium, is applied to the intermediate layer after the same has been applied to the first lithium layer and before applying the protective layer, and the second lithium layer is electrochemically removed after the protective layer has been applied.

12. The rechargeable lithium-ion battery of claim 8, further comprising:
   a cathode including an active cathode material and a cathode current collector;
   a separator between the anode and cathode; and
   a liquid electrolyte between the anode and cathode.

13. The lithium electrode of claim 1, wherein the current collector includes copper.

14. The lithium electrode of claim 1, wherein the first lithium layer includes a lithium foil.

15. The lithium electrode of claim 1, wherein the intermediate layer includes a sheet of material including a cross-linked poly-acrylate.

16. A method of manufacturing a rechargeable lithium-ion battery, comprising:
   the method for manufacturing the lithium electrode of claim 9;
   providing a cathode including an active cathode material and a cathode current collector;
   providing a separator between the anode and cathode; and
   providing a liquid electrolyte between the anode and cathode.

* * * * *